United States Patent

[11] 3,584,634

| [72] | Inventor | Edwin F. Jagdmann<br>Northville, Mich. |
|---|---|---|
| [21] | Appl. No. | 2,603 |
| [22] | Filed | Jan. 13, 1970 |
| [45] | Patented | June 15, 1971 |
| [73] | Assignee | Ford Motor Company<br>Dearborn, Mich. |

[54] LABYRINTH SEAL FOR A GOVERNOR VALVE ASSEMBLY IN AN AUTOMATIC POWER TRANSMISSION MECHANISM
6 Claims, 1 Drawing Fig.

[52] U.S. Cl. .................................................. 137/54,
74/864
[51] Int. Cl. ......................................................... G50d 13/10

[50] Field of Search............................................ 74/864;
137/54, 55

[56] References Cited
UNITED STATES PATENTS

| 3,279,486 | 10/1966 | Duffy et al. ..................... | 137/54 |
| 3,431,928 | 3/1969 | Pierce, Jr. ...................... | 137/54 |
| 3,450,144 | 6/1969 | Horsch .......................... | 137/54 |

Primary Examiner—C. J. Husar
Attorneys—John R. Faulkner and Donald J. Harrington ABSTRACT: A running seal adapted to establish a fluid connection between relatively movable radial surfaces in a valve system, said fluid connection forming in part a fluid-pressure-flow path between a pressure source and movable valve elements and between the movable valve elements and a relatively stationary valve body.

PATENTED JUN 15 1971
3,584,634
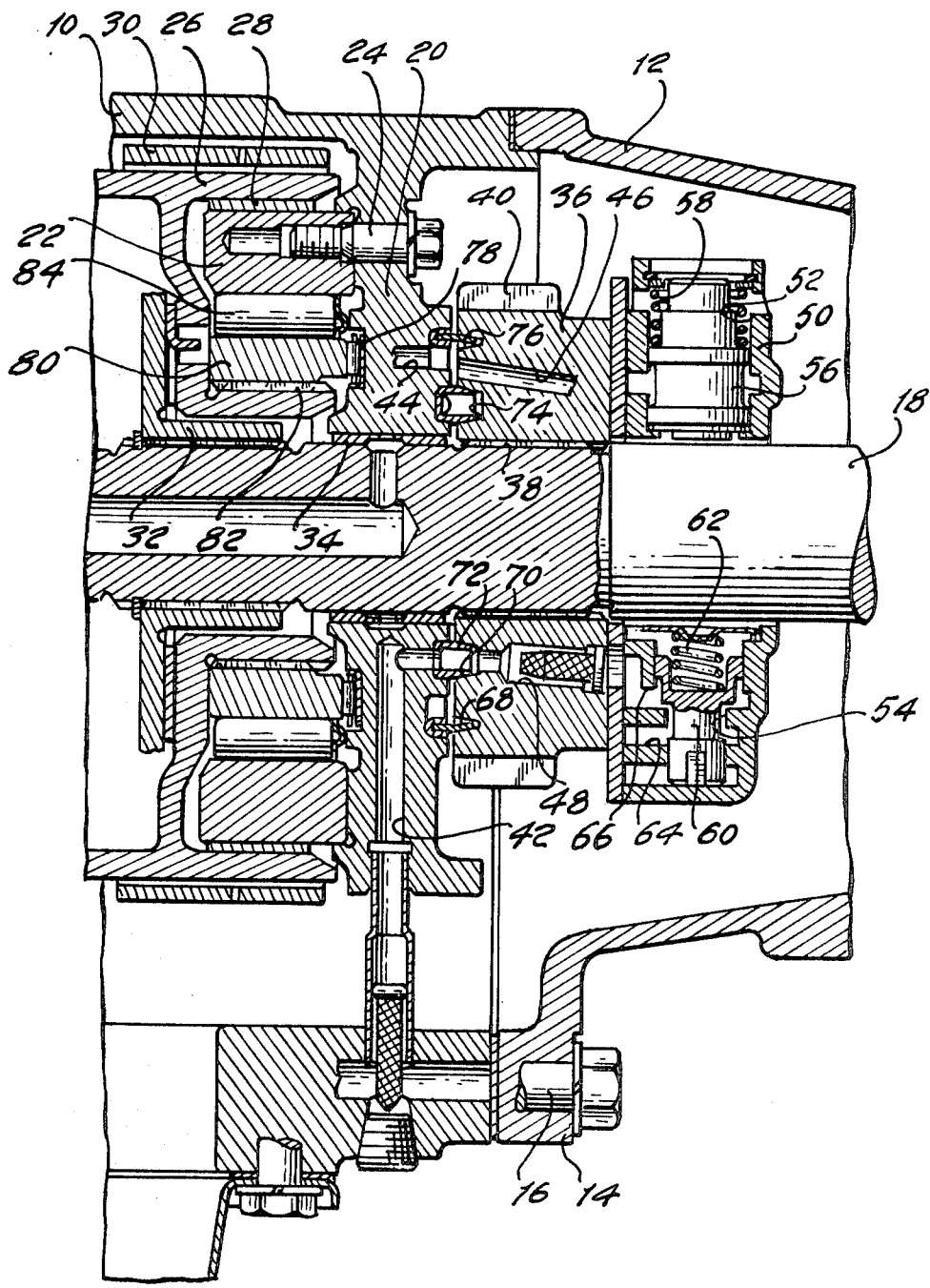
INVENTOR:
EDWIN F. JAGDMANN
BY
John A. Faulkner
and Daniel J. Harrington
ATTORNEYS.

3,584,634

LABYRINTH SEAL FOR A GOVERNOR VALVE ASSEMBLY IN AN AUTOMATIC POWER TRANSMISSION MECHANISM

GENERAL DESCRIPTION OF THE INVENTION

My invention is an improvement in the governor valve body and transmission housing structure shown in R. L. Leonard et al. U.S. Pat. No. 3,295,387, which is assigned to the assignee of my instant invention. Leonard et al. patent shows an automatic power transmission mechanism for use in an automotive vehicle driveline. That mechanism includes a transmission housing which encloses planetary gear elements and which is capable of establishing plural torque delivery paths between a bladed turbine of a hydrokinetic torque converter and a transmission tail shaft connected drivably through a driveline assembly to the vehicle traction wheels. The relative motion of the gear elements is controlled by pressure operated servos which are actuated and released by an automatic control valve system.

The valve system responds in part to a pressure signal developed by a compound fluid pressure governor connected drivably to the transmission tail shaft. The governor comprises a valve body secured to the governor oil collector body which in turn is received within a sleeve secured to an end wall of the stationary transmission. The governor oil collector body is internally ported and is provided with axially spaced seal rings which isolate fluid flow inlet passages from a fluid flow outlet passage for the governor. A parking gear for a mechanical parking brake is secured to the tail shaft and is disposed between the stationary wall of the transmission housing and the governor oil collector body.

My improved seal structure eliminates the necessity for providing a governor oil collector body of the type shown in the Leonard et al. patent and the overall axial length of the transmission structure is reduced accordingly. My improved seal structure also includes simplified sealing elements which reduce the manufacturing cost of the transmission structure and provide more effective sealing of the flow passages for the governor.

In my improved mechanism the governor body for the compound governor, which establishes a speed signal for the control valve circuit, is secured directly to the parking gear. By preference this gear is formed of sintered metal and is arranged with internal passages providing fluid delivery to the governor and a fluid flow exit path for the governor pressure signal developed by the governor. The internal passages in the parking gear communicate with relatively stationary passages in an adjacent wall portion of the transmission housing. This connection is established by seal sleeves secured to the stationary wall portion of the housing and extended within registering annular grooves in the adjacent side of the parking gear. The pressure developed in the internal passages in the parking gear act upon the seal sleeves thereby urging them into sealing engagement with the rotary surfaces of the grooves in the parking gear as the tail shaft is rotated during operation. The use of such seals makes possible simplified manufacturing and assembly procedures in comparison to the sealing arrangement shown, for example, in the Leonard et al. patent. Leakage around the seals is eliminated and a more effective speed signal thus is made available to the control valve body.

The provision of a simplified, space-saving seal arrangement for a rotary governor valve assembly of the type above described is the principal object of my invention.

BRIEF DESCRIPTION OF THE DRAWING

The single FIGURE shows a longitudinal cross-sectional view of the rearward portion of an automatic power transmission mechanism including the transmission parking gear and the governor valve body.

PARTICULAR DESCRIPTION OF THE INVENTION

Numeral 10 designates the rearward portion of a power transmission mechanism. Reference may be made to U.S. Pat. No. 3,295,387 for a more complete description and illustration of the transmission housing 10 as well as the gear elements enclosed within the housing. The transmission extension housing 12 is secured to the right-hand side of the housing 10. Housing 12 includes a bolt-flange 14 which is bolted to the margin of the housing 10 by bolts 16. Housing 12 encloses power output shaft 18.

End wall 20 for the housing 10 has secured thereto a brake drum support ring 22, which is secured to the wall 20 by bolts 24. The inner periphery of the drum, which is shown at 26, is journaled on the outer periphery of the ring 22 by a suitable bushing 28. A brake band 30 surrounds the drum 26. This drum forms a part of the carrier of a planetary gear unit (not shown).

Shaft 18 is splined to the supporting hub 32 for a ring gear of the planetary gear unit of which the brake drum 26 forms a part. Shaft 18 is journaled in bearing opening 34 in the wall 20.

Parking gear 36 is splined to shaft 18 as shown at 38. Gear 36 includes gear teeth 40 which are adapted to be engaged by the parking pawl that is under the control of the vehicle operator. The pawl in turn is anchored on the transmission case so that the parking torque imposed on the output shaft 18 is distributed directly to the transmission housing.

Line pressure from a positive displacement pump (not shown) is distributed through an internal passage 42 formed in the wall 20. A governor pressure passage 44 also is formed in the wall 20. It communicates with a valve body located in the sump region of the transmission which is situated below the housing 10. The signal can be utilized by the valve system to initiate the control functions for the servos. A governor pressure crossover passage 46 is formed in the gear 36, and a line pressure distributor passage 48 also is formed in the gear 36.

The right-hand side of the gear has secured thereto a governor valve body 50. This is formed with radial valve openings 52 and 54. Primary valve element 56 is slidably positioned in valve opening 52 and is urged radially inwardly by valve spring 58. A secondary valve element 60 is positioned slidably in the valve opening 54. It is urged radially outwardly by valve spring 62. It includes valve lands of differential diameter which register with internal valve lands formed in the opening 54. Fluid pressure from line pressure line 48 is distributed to the valve opening 54 through port 64. The radially outward end of the valve chamber 54 communicates with valve chamber 52 and is blocked by the primary valve element when the speed rotation of the outward shaft 18 is below the predetermined value. When the outward shaft speed is sufficient to cause valve element 56 to be urged radially outwardly under the influence of centrifugal force, a crossover passage between the primary valve and the secondary valve is opened to exhaust. Governor pressure passage 46 communicates with an intermediate region of the valve opening 54 through port 66. The radially inward end of the valve opening 54 forms an exhaust port.

A fluid connection between the passages 42 and 48 and between the passages 44 and 46 is established by annular seals in the form of sleeves 68, 70 and 72. Seals 70 and 72 are seated at one end thereof in recesses formed in the right face of the end wall 20 for the transmission housing 10. They extend axially and register with an annular groove 74 formed in the parking gear 36. This annular groove has tapered sides to permit a surface engagement of the seals 70 and 72 with the walls of the groove 74.

Annular seal 68 also is received within an annular recess in the right face of the end wall 20. It extends axially into groove 76 formed in the parking gear 36.

The pressure in the passages 48 and 46 urge the seals 68, 70 and 72 into sealing engagement with the registering walls of the recesses 74 and 76. A suitable thrust washer is interposed between the matching surfaces of the wall 20 and overrunning brake race 80 at the interface of wall 20 and gear 36. Thrust forces are carried to the wall 20 through thrust washer 78 which is engaged by the inner race 80 of an overrunning brake. Inner race 80 is splined at 82 to the drum 26. Overrunning brake elements 84 are situated between the race 80 and the annular support ring 22, which serves as an outer race. This outer race is cammed to provide recesses that receive the brake elements 84.

Overrunning motion of the drum 26 is permitted in one direction but the brake prevents rotation of the drum 26 in the opposite direction.

The seals 68, 70 and 72 enter the tapered grooves in the parking gear face during assembly of the parking gear. The seals themselves are shown in registry with grooves formed in the right-hand face of the wall 20. If desired, the seals could be provided with an annular cage on the left-hand margins which case would be press fitted into grooves formed in the wall 20. In the other case, however, the right-hand of the grooves would engage and be deformed by the tapered faces of the grooves 74 and 76 as initial contact is made during assembly.

Having described a preferred form of my invention, what I claim and desire to secure by U.S. Letters patent is:

1. An automatic power transmission mechanism having a tail shaft, a power input shaft and gearing connecting said shafts, a compound governor valve assembly comprising a governor valve body drivably connected to said tail shaft, a transmission housing enclosing said tail shaft and said gearing including a support wall, said tail shaft being journaled on and supported by said wall, an annular member secured to said tail shaft directly adjacent said valve body, said annular member and said wall having juxtaposed radial surfaces in close proximity, at least one annular groove formed in one of said radial surfaces, annular yieldable seal sleeves secured to one of said radial surfaces and extending to the adjacent radial surface in registry with the annular groove formed therein, a fluid flow passage formed in said annular member in communication with said annular groove, a second fluid flow passage in said wall in communication with the radial surface of said wall at a location intermediate said seal sleeves whereby said seal sleeves provide a fluid connection between the fluid passage in said wall and the fluid passage in said annular member as said tail shaft is rotated with respect to said housing.

2. In an automatic power transmission mechanism having a housing, gearing located in said housing and establishing plural-torque delivery paths between a driving member and a driven member, an end wall for said housing, said driven member being driven rotatably on and supported by said wall, a governor valve body connected to said driven member, a parking gear secured to said driven member adjacent said governor body, a pressure source, a first passage communicating with said pressure source and extending through said wall, a governor pressure passage in said wall, a pair of pressure passages in said gear, one of said passages in said gear communicating with said governor body for distributing a governor pressure signal therefrom, the other passage in said gear communicating with said governor body for transmitting pressure thereto from said source, a pair of radial juxtaposed surfaces formed on said end wall and on said gear, annular grooves formed in spaced relationship on one of said surfaces, seal sleeves fixed to the other of said surfaces and extending axially with respect to said driven member, one of said grooves communicating with said other pressure passage in said gear and the other groove communicating with said one pressure passage in said gear, a pair of said seal sleeves being received in the groove communicating with said other pressure passage, another of said seal sleeves registering with the groove communicating with said one pressure passage, said first passage in said wall communicating with the space between said pair of rings, the governor pressure passage in said wall communicating with said one pressure passage adjacent said other of said rings whereby the pressure in said governor pressure passage and said first passage urge said seal sleeves into sliding sealing engagement with the surfaces of said grooves.

3. The combination as set forth in claim 1 wherein the first passage communicates with the radially innermost groove and the governor pressure passage communicates with the radially outermost groove.

4. The combination as set forth in claim 2 wherein the first passage communicates with the radially innermost groove and the governor pressure passage communicates with the radially outermost groove.

5. The combination as set forth in claim 3 wherein a single one of said seal sleeves registers with the outermost surface of the outermost groove and said pair of seal sleeves registers with the sides of the innermost one of said grooves.

6. The combination as set forth in claim 4 wherein a single one of said seal sleeves registers with the outermost surface of the outermost groove and said pair of seal sleeves registers with the sides of the innermost one of said grooves.